(12) United States Patent
Pelletier et al.

(10) Patent No.: US 9,194,297 B2
(45) Date of Patent: Nov. 24, 2015

(54) MULTIPLE CIRCUIT FUEL MANIFOLD

(75) Inventors: Robert Roger Pelletier, Chardon, OH (US); Michael Kenneth Teter, Chardon, OH (US); Charles Raymond Bovard, Concord, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 926 days.

(21) Appl. No.: 13/315,165

(22) Filed: Dec. 8, 2011

(65) Prior Publication Data

US 2012/0145273 A1 Jun. 14, 2012

Related U.S. Application Data

(60) Provisional application No. 61/420,814, filed on Dec. 8, 2010.

(51) Int. Cl.
| | | |
|---|---|---|
| F02C 7/22 | (2006.01) | |
| F02C 7/228 | (2006.01) | |
| F23R 3/36 | (2006.01) | |
| F23R 3/34 | (2006.01) | |

(52) U.S. Cl.
CPC .............. *F02C 7/222* (2013.01); *F02C 7/228* (2013.01); *F23R 3/34* (2013.01); *F23R 3/36* (2013.01)

(58) Field of Classification Search
CPC ............ F02C 7/22; F02C 7/222; F02C 7/228; F23R 3/34; F23R 3/343; F23R 3/36
See application file for complete search history.

(56) References Cited

U.S. PATENT DOCUMENTS

| | | |
|---|---|---|
| 3,285,007 A | 11/1966 | Carlisle et al. |
| 3,691,765 A | 9/1972 | Carlisle |
| 3,713,588 A | 1/1973 | Sharpe |
| 4,305,255 A | 12/1981 | Davies et al. |
| 4,474,014 A | 10/1984 | Markowski |
| 5,062,792 A | 11/1991 | Maghon |
| 5,423,178 A | 6/1995 | Mains |
| 5,427,419 A | 6/1995 | Frey et al. |
| 5,570,580 A | 11/1996 | Mains |
| 6,950,441 B1 | 9/2005 | Kaczmarczyk et al. |
| 7,028,483 B2 | 4/2006 | Mansour et al. |
| 7,107,773 B2 | 9/2006 | Little |
| 7,762,073 B2 | 7/2010 | Li et al. |
| 7,849,693 B2 | 12/2010 | Bainville et al. |
| 2002/0152751 A1 | 10/2002 | Mandai et al. |
| 2004/0050057 A1 | 3/2004 | Bland et al. |
| 2004/0255589 A1 | 12/2004 | Yoshida et al. |
| 2005/0050899 A1 | 3/2005 | Little |
| 2005/0160717 A1 | 7/2005 | Sprouse et al. |
| 2005/0229604 A1 | 10/2005 | Chen |

(Continued)

FOREIGN PATENT DOCUMENTS

JP 09-280073 10/1997

*Primary Examiner* — Andrew Nguyen
(74) *Attorney, Agent, or Firm* — Renner, Otto, Boisselle & Sklar, LLP

(57) ABSTRACT

Provided is a fuel manifold with more than one fuel circuit for connecting a fuel source or fuel sources to at least one fuel injector, the fuel manifold having an inner tube for conveying fuel through a first fuel passage formed interiorly of the inner tube and an outer tube forming with a slot along a length of the inner tube a second fuel passage. If one of the fuel passages is in a low flow or no flow condition, fuel flowing through the other of the fuel passages acts to cool the fuel passage in the low flow or no flow condition to prevent stagnant fuel in the passage from heating up and coking.

19 Claims, 12 Drawing Sheets

(56) References Cited

U.S. PATENT DOCUMENTS

| | | |
|---|---|---|
| 2006/0101814 A1 | 5/2006 | Saitoh et al. |
| 2007/0006590 A1 | 1/2007 | Muldoon et al. |
| 2007/0204622 A1 | 9/2007 | Patel et al. |
| 2008/0000214 A1 | 1/2008 | Kothnur et al. |
| 2008/0072599 A1 | 3/2008 | Morenko et al. |
| 2008/0083223 A1 | 4/2008 | Prociw et al. |
| 2009/0113893 A1 | 5/2009 | Li et al. |
| 2009/0211256 A1 | 8/2009 | Williams |
| 2010/0050645 A1 | 3/2010 | Haggerty |
| 2010/0051726 A1 | 3/2010 | Houtman et al. |
| 2010/0071663 A1 | 3/2010 | Patel et al. |
| 2010/0115966 A1 | 5/2010 | Nagai et al. |
| 2010/0326080 A1 | 12/2010 | Rogers et al. |
| 2011/0067402 A1 | 3/2011 | Wiebe et al. |
| 2011/0162373 A1 | 7/2011 | Intile et al. |

SECTION M - M

SECTION N - N

US 9,194,297 B2

MULTIPLE CIRCUIT FUEL MANIFOLD

RELATED APPLICATIONS

This application claims the benefit of U.S. Provisional Application No. 61/420,814 filed Dec. 8, 2010, which is hereby incorporated herein by reference.

FIELD OF INVENTION

The present invention relates generally to gas turbine engines, and more particularly to multiple circuit fuel manifolds for gas turbine engines.

BACKGROUND

A gas turbine engine typically includes one or more fuel injectors for directing fuel from a manifold to a combustion chamber of a combustor. Each fuel injector typically has an inlet fitting connected either directly or via tubing or a hose to the manifold, a tubular extension or stem connected at one end to the fitting, and one or more fuel injectors connected to the other end of the stem for directing the fuel into the combustion chamber. A fuel passage (e.g., a tube or cylindrical passage) extends through the stem to supply the fuel from the inlet fitting to the injector. Appropriate valves and/or flow dividers can be provided to direct and control the flow of fuel through the injector and/or fuel passage. Fuel injectors can include one or more fuel circuits.

SUMMARY OF INVENTION

The present invention provides a fuel manifold with more than one fuel circuit for connecting a fuel source or fuel sources to at least one fuel injector, the fuel manifold having an inner tube for conveying fuel through a first fuel passage formed interiorly of the inner tube and an outer tube forming with a slot along a length of the inner tube a second fuel passage. If one of the fuel passages is in a low flow or no flow condition, fuel flowing through the other of the fuel passages acts to cool the fuel passage in the low flow or no flow condition to prevent stagnant fuel in the passage from heating up and coking. This is useful, for example, when the fuel manifold is surrounded by a high temperature environment, such as greater than 250° Fahrenheit.

In particular, the multiple circuit fuel manifold includes a manifold tube assembly and a manifold fitting surrounding the manifold tube assembly, the manifold fitting having an end configured to be coupled to a connector. The manifold tube assembly includes an inner tube for conveying fuel through a first fuel passage formed interiorly of the inner tube, the inner tube including at least one slot along a length of the outside diameter thereof forming with the outer tube a second fuel passage, and an opening in a side wall of the inner tube in an area of the inner tube surrounded by the manifold fitting, the opening provided to convey fuel from the first fuel passage to an inner connector tube disposed in the opening. The manifold fitting also including an outer tube surrounding the inner tube and forming with the at least one slot a second fuel passage, the outer tube including an opening in a side wall of the outer tube in an area of the outer tube surrounded by manifold fitting, the opening allowing fuel to pass from the at least one slot to a gap between the manifold fitting and the inner connector tube.

In one embodiment, the inner tube includes at least two slots, one of the slots forming with the outer tube the second fuel passage and the other slot forming with the outer tube a third fuel passage.

In another embodiment, the fuel in the second fuel passage passes into the gap and flows downstream of the manifold fitting and the fuel in the third fuel passage flows downstream of the manifold fitting.

In still another embodiment, the at least one slot is a helical slot.

According to another aspect of the invention, a method of delivering fuel from a multiple circuit manifold to a fuel injector is provided. The manifold including a manifold inlet having first and second inlet fittings, a manifold tube assembly, and a manifold fitting surrounding the manifold tube assembly, the manifold tube assembly including an inner tube for conveying fuel through a first fuel passage formed interiorly of the inner tube, the inner tube having at least one slot along a length of an outside diameter thereof and an opening in a side wall of the inner tube in an area of the inner tube surrounded by the manifold fitting, the opening provided to convey fuel from the first fuel passage to an inner connector tube disposed in the opening, and the outer tube surrounding the inner tube and forming with the at least one slot a second fuel passage, the outer tube including an opening in a side wall of the outer tube in an area of the outer tube surrounded by manifold fitting, the opening allowing fuel to pass from the at least one slot to a gap between the manifold fitting and the inner connector tube. The method including receiving fuel at the first inlet fitting, delivering the fuel through the first fuel passage to the inner connector, receiving fuel at the second inlet fitting, and delivering fuel through the second fuel passage to the gap.

The foregoing and other features of the invention are hereinafter described in greater detail with reference to the accompanying drawings.

DETAILED DESCRIPTION

Figure 1:
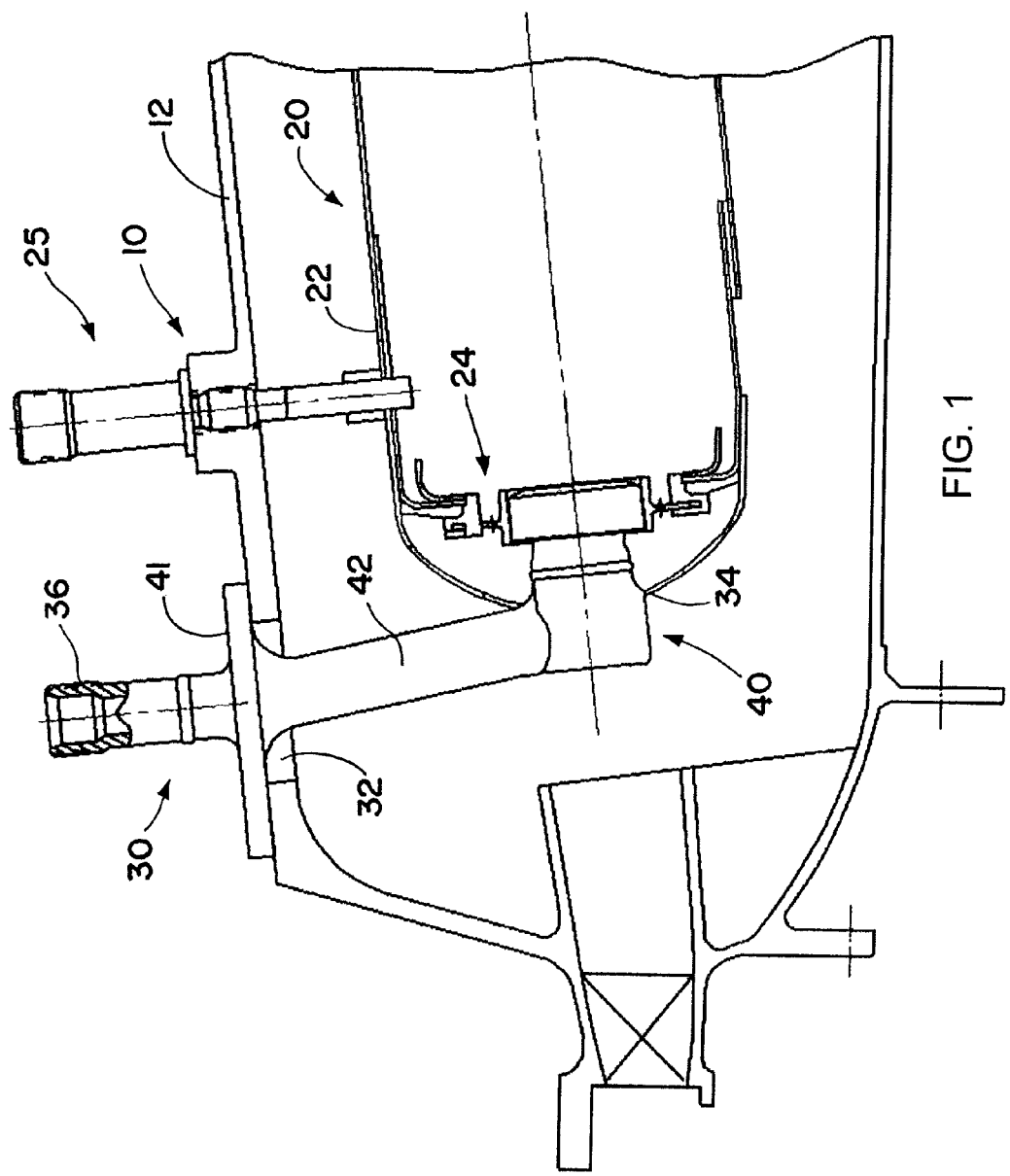
FIG. 1 is a cross-sectional view of a portion of an exemplary gas turbine engine illustrating a fuel injector in communication with a combustor.

Referring now in detail to the drawings and initially to FIG. 1, a gas turbine engine for a gas turbine is illustrated generally at 10. The gas turbine engine 10 includes an outer casing 12 extending forwardly of an air diffuser 14. The casing 12 and diffuser 14 enclose a combustor, indicated generally at 20, for containment of burning fuel. The combustor 20 includes a liner 22 and a combustor dome, indicated generally at 24. An igniter, indicated generally at 25, is mounted to the casing 12 and extends inwardly into the combustor 20 for igniting fuel. The above components can be conventional in the art and their manufacture and fabrication are well known.

A fuel injector, indicated generally at 30, is received within an aperture 32 formed in the engine casing 12 and extends inwardly through an aperture 34 in the combustor liner 22. The fuel injector 30 includes a fitting 36 exterior of the engine casing 12 for receiving fuel, as by connection to a fuel manifold 44 (FIG. 2) via tubes or hoses; a fuel nozzle tip assembly, indicated generally at 40, disposed within the combustor 20 for dispensing fuel; and a housing 42 interconnecting and structurally supporting the nozzle tip assembly 40 with respect to fitting 36. The fuel injector 30 is suitably secured to the engine casing 12, as by means of an annular flange 41 that may be formed in one piece with the housing 42 proximate the fitting 36. The flange 41 extends radially outward from the housing 42 and includes appropriate means, such as apertures, to allow the flange 41 to be easily and securely connected to, and disconnected from, the casing 12 of the engine using, for example, bolts or rivets.

Figure 2:
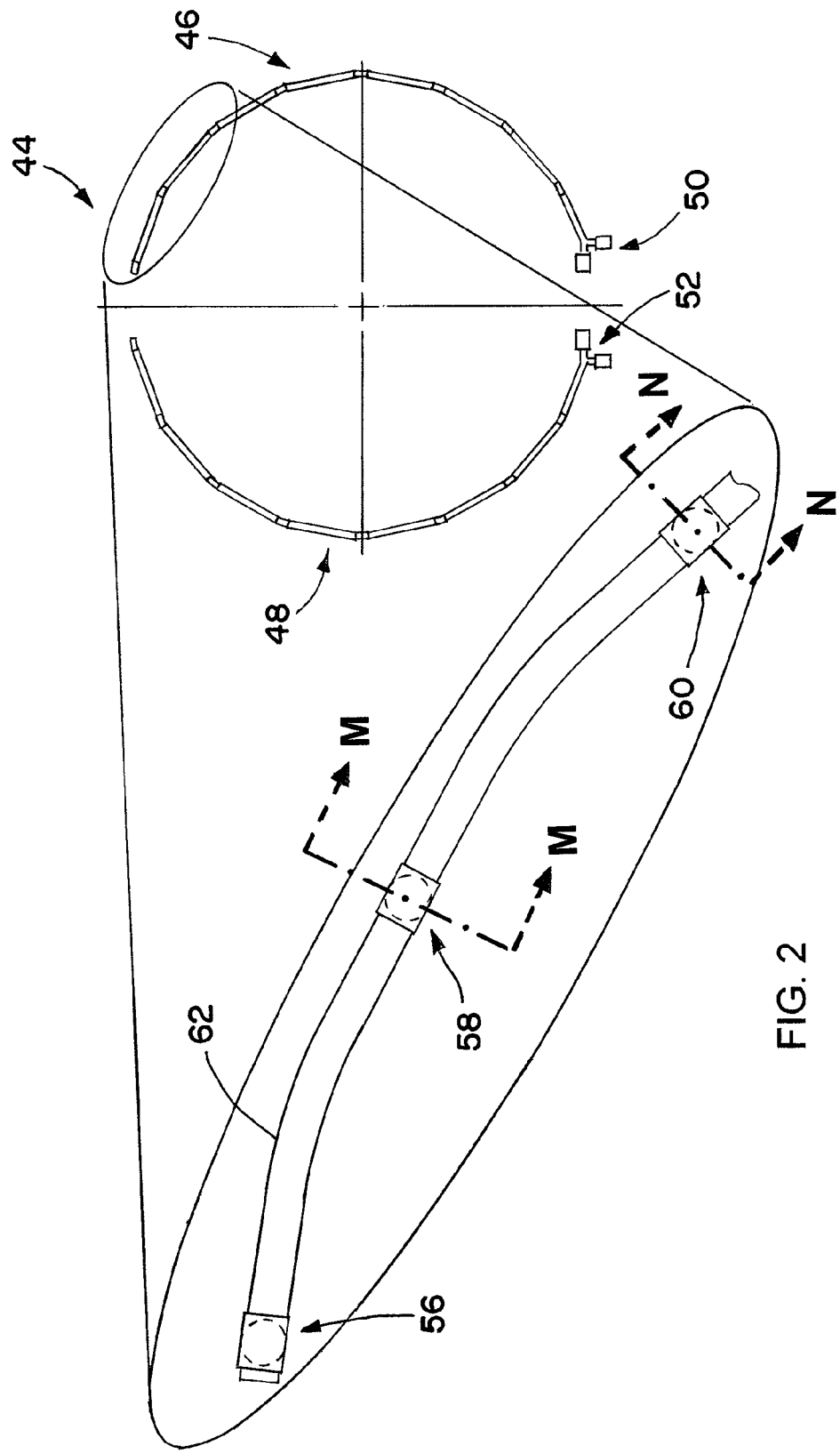
FIG. 2 is a side view of two manifold halves according to the invention.

Turning now to FIG. 2, the manifold 44 is shown including two halves 46 and 48, which may be substantially similar to one another, having respective manifold inlets 50 and 52 for receiving fuel. Although shown in two halves, it will be appreciated that the manifold may be separated into thirds, fourths, be a single continuous manifold, etc. Each manifold half 46, 48 includes at least one manifold fitting, and in the illustrated embodiment a plurality of manifold fittings 56, 58 and 60. The manifold fittings 56, 58 and 60 are attached to a manifold tube assembly 62 that provides fuel from the manifold inlets 50 and 52 to the plurality of manifold fittings. The manifold fittings are configured to be coupled to a connector 64 (FIG. 3), which may be coupled to a tube or hose portion, the tube or hose portion also being coupled to the injector 30 so that fuel in the manifold can be distributed to a plurality of fuel injectors 30. The tube or hose portion may be any suitable tube or hose portion, such as disclosed in a patent application entitled FLEXIBLE HOSE ASSEMBLY WITH MULTIPLE FLOW PASSAGES, being filed concurrently herewith under Ser. No. 13/315,150, and the tube portion may include a flexible hose such as the type disclosed in U.S. patent application Ser. No. 12/578,079, which is hereby incorporated herein by reference.

Figure 3:
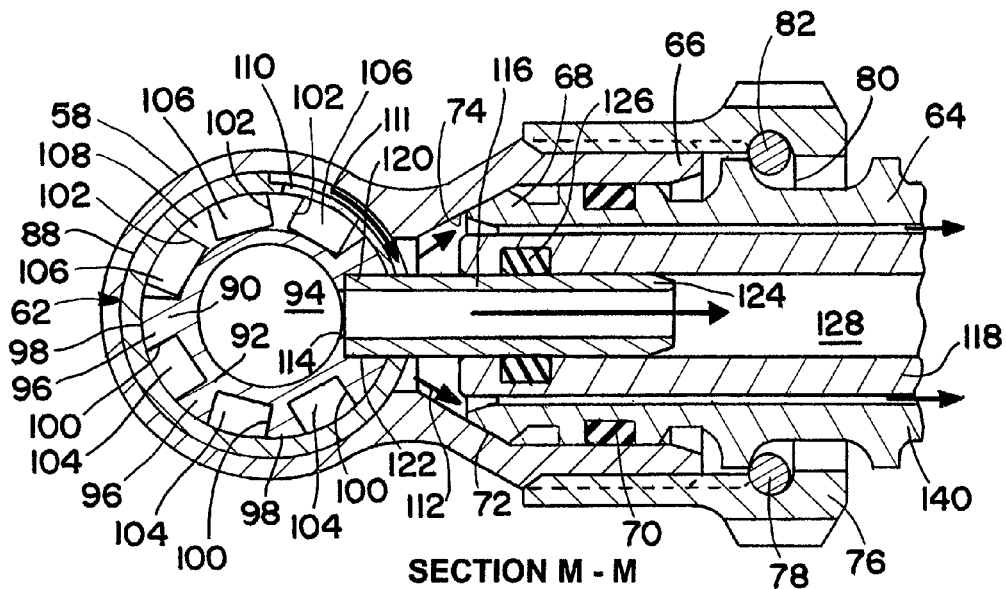
FIG. 3 is a cross-sectional view of a blown up portion of FIG. 2 illustrating an exemplary manifold half and fitting portion taken substantially along the line M-M.

Turning now to FIG. 3, the manifold fitting 58 is configured to be coupled to the connector 64 by any suitable means. As shown, the manifold fitting 58 has an open end 66 that surrounds a proximal end 68 of the connector 64 and which is sealed to the connector by any suitable means, such as by O-ring 70. The proximal end 68 of the connector 64 is configured to be inserted into the manifold fitting 58 until a tapered portion 72 of the proximal end 68 contacts a tapered shoulder 74 on an inner portion of the manifold fitting 58, which is also a sealing surface.

To secure the proximal end 68 of the connector 64 in the manifold fitting 58, a nut 76 is provided that surrounds and is coupled to the proximal end 68 of the connector 64 and the end 66 of the manifold fitting 58. The nut 76 may be coupled to the end 66 of the manifold fitting by any suitable means, for example by threads on an inner circumferential surface of the nut 76 being coupled to threads on an outer circumferential surface of the end 66 of the manifold fitting 58. The nut 76 may be coupled to the proximal end 68 of the connector 64 by any suitable means, for example by a thrust wire 78 being received in groove 80 of the connector 64 and groove 82 of the nut 76.

As noted above, the manifold fitting 58 surrounds the manifold tube assembly 62, and the manifold fitting and manifold tube assembly may be sized, for example, such that the outer diameter of the manifold tube assembly is substantially equal to the inner diameter of the manifold fitting. Once installed on the tube assembly 62, the manifold fitting 58 can be coupled to the tube assembly by any suitable means, such as by brazing or welding, in order to provide a fluid tight seal.

Referring now to the manifold tube assembly 62 in detail, the manifold tube assembly 62 includes an outer tube 88 and an inner tube 90 disposed interiorly of the outer tube. The inner tube has a cylindrical portion 92 forming a main fuel passage 94 and a plurality of projections 96 extending radially outward from the cylindrical portion 92. In the illustrated embodiment, the projections are wedge shaped, although it will be appreciated that the projections can be any suitable shape. The projections 96 are sized such that the projections contact an inner diameter of the outer tube 88, and are coupled to the outer tube 88 by any suitable means, for example by brazing or welding at 98.

The projections 96 form with the outer tube 88 a plurality of slots or grooves, such as a first set of slots 100 and a second set of slots 102. In the illustrated embodiment, each set of slots includes three slots, although it will be appreciated than any suitable number of slots may be included. The first set of slots 100 provide a first pilot fuel passage 104 so that fuel can flow from an area upstream of the manifold fitting, for example the manifold fitting 60, to an area downstream of the manifold fitting 58, for example the manifold fitting 56, or to any other manifold fitting desired without being diverted.

The second set of slots 102 provides a second pilot fuel passage 106. For fuel to flow from the second pilot fuel passage 106 to an injector coupled to the manifold fitting 58, a first localized slot 108 and a second localized slot 110 are provided. The slot 108 is provided between the outer wall of the cylindrical portion 92 and the inner wall of outer tube 88 at the portion of the inner tube 90 surrounded by the manifold fitting 58. The second localized slot 110 is provided in the outer wall of the outer tube 88 and a gap 111 formed between the outer wall of the manifold tube and the inner wall of the manifold fitting such that fluid can flow between the outer tube 88 and the manifold fitting 58. Fluid flowing through the second pilot passage 106 can exit the passage via the first localized slot 108, flow through the second localized slot 110 and towards the injector along a second fuel passage 112 separated from the main fuel passage 94 as will be described in detail below.

The inner tube 90 also includes an opening 114 in a side wall of a region of cylindrical portion 92 surrounded by the manifold fitting 58 so that fluid in the main fuel passage 94 can flow from the cylindrical portion 92 to the injector. In the illustrated embodiment, the opening 114 is formed in a portion of the side wall surrounded by two projections 96. A first connector tube 116 is provided in fluidic communication with the opening 114 to allow fuel flowing through the main fuel passage 94 to exit the cylindrical portion 92 via the opening 114 and to flow through the first connector tube 116. The fuel continues to flow from the first connector tube 116 to a second connector tube 118 having a distal end coupled to the tube portion (not shown). The first connector tube has a proximal end 120 that is disposed between and coupled to the projections by any suitable means, for example by a braze or weld at 122. The first connector tube also has a distal end 124 surrounded by the second connector tube 118 and sealed to the second connector tube by any suitable means, such as by O-ring 126. The second connector tube 118 is free to slide relative to the first connector tube 116, for example during installation or due to vibration from the engine. A first fuel passage 128 connecting the main fuel passage 94 to the injector is thereby formed interiorly of the first connector tube 116, the second connector tube 118 and the tube portion.

The second connector tube 118 is disposed interiorly of the connector 64 and sized such that a gap 140 is formed between the second connector tube and the connector 64. The second connector tube 118 is also axially spaced from the proximal end 120 of the first connector tube 116 a sufficient distance such that fluid flowing through the second pilot passage 106 can flow through the localized slots 108 and 110 to the second fuel passage 112, which extends from the localized slots through the gap 140 and to the injector. One or more centering lugs 142 are provided between the second connector tube 118 and the connector 64 that prevent the connector tube from contacting an inner wall of the connector to maintain the gap 140 between the second connector tube and the connector. The centering lug may have, for example, a circular portion surrounding the second connector tube 118 and a plurality of protrusions extending radially outward from the circular portion that contact an inner circumferential surface of the connector 64, which will allow fuel flow between the lugs to pass freely.

The fuel passages 112 and 128 are separated and sealed from one another from the manifold 44 to the injector 30 and eliminate the need for multiple tubes or hoses running from a manifold to each injector. It will be appreciated that although described as providing two fuel passages, more than two passages may be provided.

During fuel staging of the gas turbine, for example, one of the fuel passages may be in a low flow or no flow condition, which may result in stagnant fuel collecting in the fuel passage. Fuel flowing through the other of the fuel passages acts to cool the fuel passage in the low flow or no flow condition to prevent the stagnant fuel from heating up and coking. This is useful, for example, when the assembly is surrounded by a high temperature environment, such as greater than 250° Fahrenheit. When the engine is started for example, fuel may be provided through the second fuel passage 112. As the engine increases in speed, the first fuel passage 128 is opened and fuel provided to the engine through the first fuel passage.

The second fuel passage 112 can then be closed, i.e. be in the no flow condition, and the flow through the first fuel passage 128 will act to cool the second fuel passage.

Figure 4:
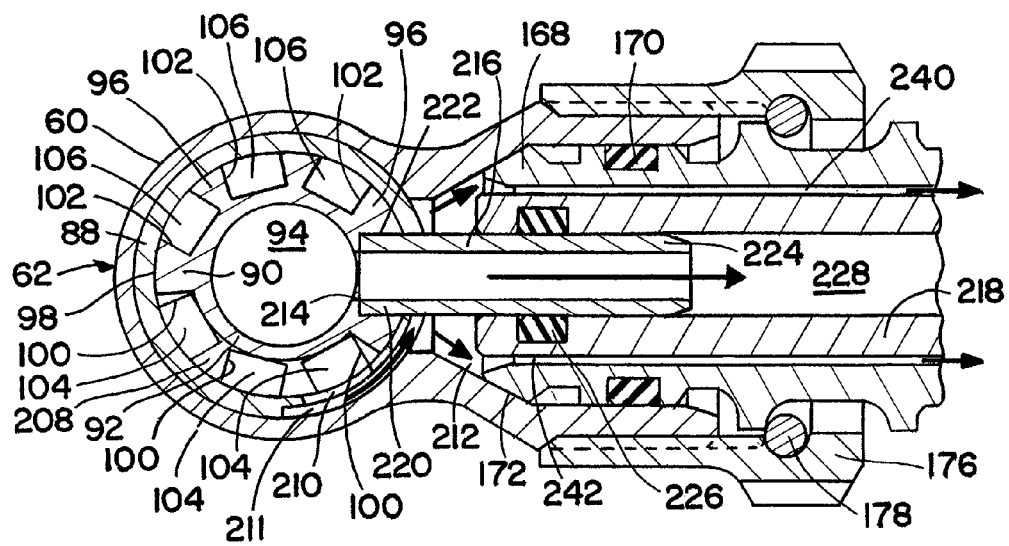
FIG. 4 is a cross-sectional view of the blown up portion of FIG. 2 illustrating the exemplary manifold half and another fitting portion taken substantially along the line N-N.

Turning now to FIG. 4, the manifold fitting 60 is configured to be coupled to a connector 164 by any suitable means. As shown, the manifold fitting 60 has an open end 166 that surrounds a proximal end 168 of the connector 164 and which is sealed to the connector by any suitable means, such as by O-ring 170. The proximal end 168 of the connector 164 is configured to be inserted into the manifold fitting 60 until a tapered portion 172 of the proximal end 168 contacts a tapered shoulder 174 on an inner portion of the manifold fitting 60, which is also a sealing surface.

To secure the proximal end 168 of the connector 164 in the manifold fitting 60, a nut 176 is provided that surrounds and is coupled to the proximal end 168 of the connector 164 and the end 166 of the manifold fitting 60. The nut 176 may be coupled to the end 166 of the manifold fitting by any suitable means, for example by threads on an inner circumferential surface of the nut 176 being coupled to threads on an outer circumferential surface of the end 166 of the manifold fitting 60. The nut 176 may be coupled to the proximal end 168 of the connector 164 by any suitable means, for example by a thrust wire 178 being received in groove 180 of the connector 164 and groove 182 of the nut 176. It will be appreciated from the foregoing that any suitable fitting portion may be used to couple to manifold fitting 60 to the tube portion.

The manifold fitting 60 surrounds the manifold tube assembly 62, and the manifold fitting and manifold tube assembly may be sized, for example, such that the outer diameter of the manifold tube assembly is substantially equal to the inner diameter of the manifold fitting. Once installed on the tube assembly 62, the manifold fitting 60 can be coupled to the tube assembly by any suitable means, such as by brazing or welding, in order to provide a fluid tight seal.

As noted above, the projections 96 form with the outer tube 88 a plurality of slots, such as the first set of slots 100 and the second set of slots 102. The second set of slots 102 provide the second pilot fuel passage 106 so that fuel can flow from an area upstream of the manifold fitting 60 to an area downstream of the manifold fitting 60, for example to the manifold fitting 58, or to any other manifold fitting desired, without being diverted.

The first set of slots 100 provide the first pilot fuel passage 104 so that fuel can flow from the pilot fuel passage 104, through first and second localized slots 208 and 210 to an injector coupled to the manifold fitting 60. The first localized slot 208 is provided between the outer wall of the cylindrical portion 92 and the inner wall of the outer tube 88 at the portion of the inner tube 90 surrounded by the manifold fitting 60. The second localized slot 210 is provided in the outer wall of the outer tube 88 and gap 211 formed between the outer wall of the manifold tube and the inner wall of the manifold fitting such that fluid can flow between the outer tube 88 and the manifold fitting 60. Fluid flowing through the first pilot passage 104 can exit the passage via the first localized slot 208, flow through the second localized slot 210 and towards the injector along a second fuel passage 212 separated from the main fuel passage 94 as will be described in detail below.

The inner tube 90 also includes an opening 214 in a side wall of a region of cylindrical portion 92 surrounded by the manifold fitting 60 so that fluid in the main fuel passage 94 can flow from the cylindrical portion 92 to the injector. In the illustrated embodiment, the opening 214 is formed in a portion of the side wall surrounded by two projections 96. A first connector tube 216 is provided in fluidic communication with the opening 214 to allow fuel flowing through the main fuel passage 94 to exit the cylindrical portion 92 via the opening 214 and to flow through the first connector tube 216. The fuel continues to flow from the first connector tube 216 to a second connector tube 218 having a distal end coupled to the tube portion (not shown). The first connector tube has a proximal end 220 that is disposed between and coupled to the projections by any suitable means, for example by a braze or weld at 222. The first connector tube also has a distal end 224 surrounded by the second connector tube 218 and sealed to the second connector tube by any suitable means, such as by O-ring 226. The second connector tube 218 is free to slide relative to the first connector tube 216, for example during installation or due to vibration from the engine. A first fuel passage 228 connecting the main fuel passage 94 to the injector is thereby formed interiorly of the first connector tube 216, the second connector tube 218 and the tube portion.

The second connector tube 218 is disposed interiorly of the connector 164 and sized such that a gap 240 is formed between the second connector tube and the connector 164. The second connector tube 218 is also axially spaced from the proximal end 220 of the first connector tube 216 a sufficient distance such that fluid flowing through the second pilot passage 106 can flow through the localized slots 208 and 210 to the second fuel passage 212, which extends from the localized slots through the gap 240 and to the injector. One or more centering lugs 242 are provided between the second connector tube 218 and the connector 164 that prevent the connector tube from contacting an inner wall of the connector to maintain the gap 240 between the second connector tube and the connector. The centering lug may have, for example, a circular portion surrounding the second connector tube 218 and a plurality of protrusions extending radially outward from the circular portion that contact an inner circumferential surface of the connector 164, which will allow fuel flow between the lugs to pass freely.

The fuel passages 212 and 228 are separated and sealed from one another from the manifold 44 to the injector 30 and eliminate the need for multiple tubes or hoses running from a manifold to each injector. It will be appreciated that although described as providing two fuel passages, more than two passages may be provided.

During fuel staging of the gas turbine, for example, one of the fuel passages may be in a low flow or no flow condition, which may result in stagnant fuel collecting in the fuel passage. Fuel flowing through the other of the fuel passages acts to cool the fuel passage in the low flow or no flow condition to prevent the stagnant fuel from heating up and coking. This is useful, for example, when the assembly is surrounded by a high temperature environment, such as greater than 250° Fahrenheit. When the engine is started for example, fuel may be provided through the second fuel passage 212. As the engine increases in speed, the first fuel passage 228 is opened and fuel provided to the engine through the first fuel passage. The second fuel passage 212 can then be closed, i.e. be in the no flow condition, and the flow through the first fuel passage 128 will act to cool the second fuel passage.

The manifold fitting 56 may be connected to a connector in the same manner as the manifold fitting 60. Additionally, the outer tube 88 and inner tube 90 may be slotted in the area surrounded by the manifold fitting 56 in a similar way as in the area surrounded by the manifold fitting 60 such that the fuel in the pilot flow passage 104 may flow to an injector. Accordingly, the fuel in the pilot flow passages flowing to an injector may alternate at manifold fittings along the length of the manifold tube assembly 62. Alternatively, it will be appreciated that the fuel flow to the injectors may be provided in any arrangement along the length of the manifold.

Figure 5:
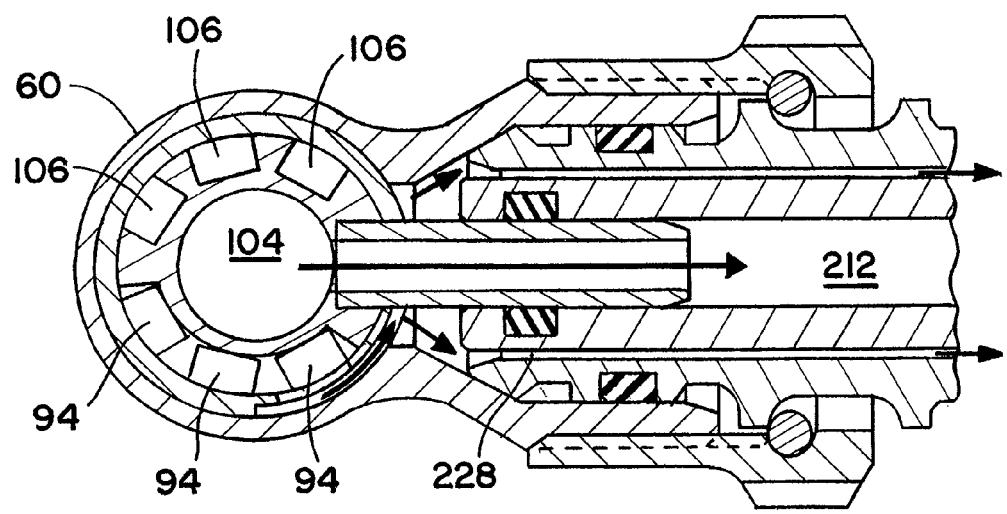
FIG. 5 is a cross-sectional view of the blown up portion of FIG. 2 illustrating another exemplary manifold half and fitting portion taken substantially along the line N-N.
Figure 6:
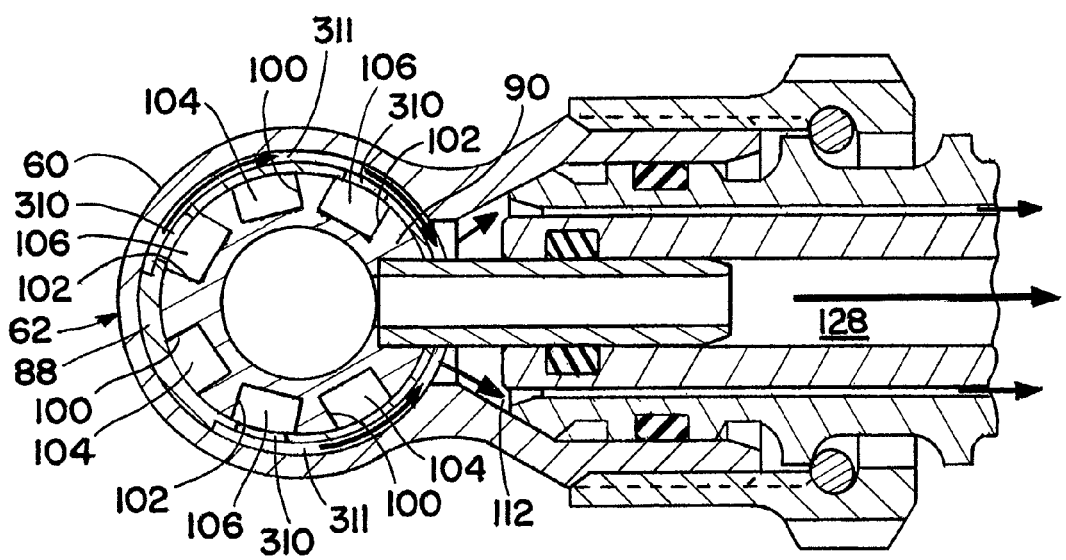
FIG. 6 is a cross-sectional view of the blown up portion of FIG. 2 illustrating still another exemplary manifold half and fitting portion taken substantially along the line N-N.

It will also be appreciated that the locations and sizing of the flow passages 94, 104 and 106 may be varied. For example, FIG. 5 illustrates the main flow passage 94 and the pilot flow passage 104 being in opposite positions compared to their positions in FIG. 4. Moreover, it will be appreciated that the positions of the slots 100 and 102 and flow passages 104 and 106 can be varied in any suitable manner. For example, as shown in FIG. 6, two slots 102 are provided at a top portion of the inner tube 90, one slot 102 is provided at a bottom portion of the inner tube, two slots 100 are provided at the bottom portion of the inner tube, and one slot 100 is provided at the top portion of the inner tube. A plurality of localized holes 310 can be provided in the outer wall of the outer tube 88 and gaps 311 formed between the outer wall of the manifold tube and the inner wall of the manifold fitting 60 such that fluid can flow between the outer tube 88 and the manifold fitting 60.

Turning now to FIGS. 7-10, exemplary embodiments of the manifold fitting, connector and nut are shown at 458, 464 and 476; 558, 564 and 576; 658, 664 and 676; 758, 764 and 776, respectively. The manifold fitting, connector and nut (and other components) of FIGS. 7-11 are substantially the same as described in FIG. 3, and consequently the same reference numerals, but indexed by 400-700 respectively are used to denote structures corresponding to similar structures in the tube assemblies. In addition, the foregoing description regarding FIG. 3 is equally applicable to components of FIGS. 7-10 except as noted below. It can be appreciated that other forms of fluid tight connections can be used, such as welding or other type of fitting.

Figure 7:
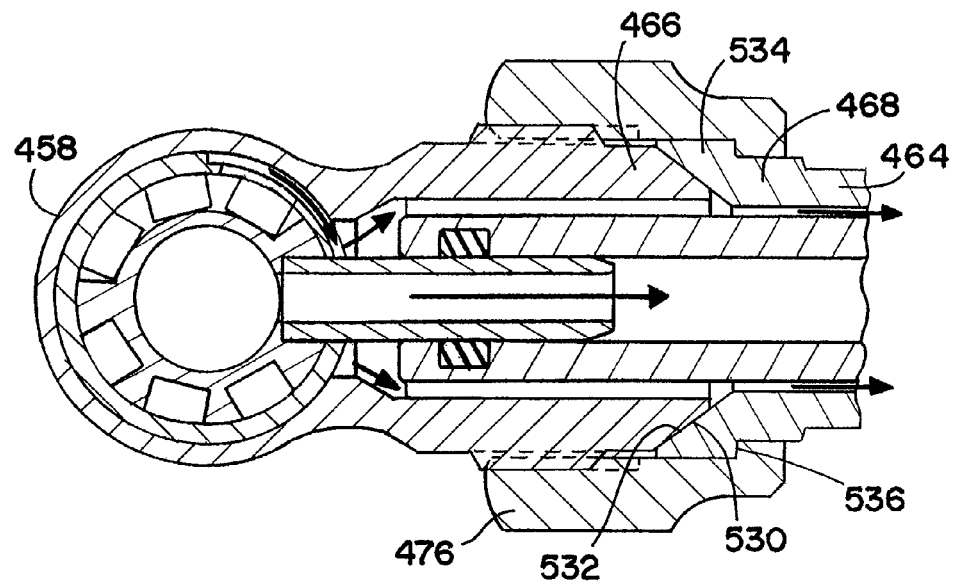
FIG. 7 is a cross-sectional view of a blown up portion of FIG. 2 illustrating another exemplary manifold half and fitting portion taken substantially along the line M-M.

Referring now to FIG. 7, a proximal end 468 of the connector 464 and an end 466 of the manifold fitting 458 each have a tapered portion 530 and 432, respectively, that abut to form a flared fitting. A nut 476, which surrounds the manifold fitting and the connector, may be provided to secure the end 466 of the manifold fitting 458 to the proximal end 468 of the connector 464. The nut 476 may be coupled to the end 466 of the manifold fitting 458 by any suitable means, for example by the threaded connection discussed above. When the nut is coupled to the end 466, a flanged portion 534 of the connector abuts an inner shoulder 536 of the nut, thereby holding the connector in place.

Figure 8:
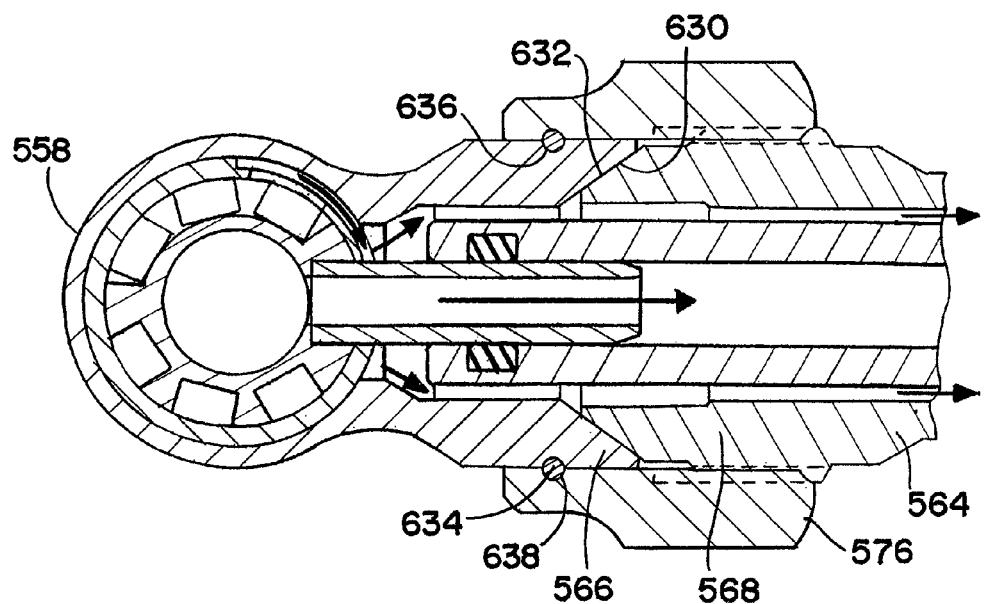
FIG. 8 is a cross-sectional view of a blown up portion of FIG. 2 illustrating yet another exemplary manifold half and fitting portion taken substantially along the line M-M.

Referring now to FIG. 8, a proximal end 568 of a connector 564 and an end 566 of a manifold fitting 558 each have a tapered portion 630 and 632, respectively, that abut to form a flared fitting. A nut 576 may be provided to secure the end 566 of the manifold fitting to the proximal end 568 of the connector. The nut 576 may be coupled to the proximal end 568 of the connector 564 by any suitable means, for example by the threaded connection discussed above. The nut 576 may be coupled to the end 566 of the manifold fitting 568 by any suitable means, for example by a thrust wire 634 received in groove 636 of the manifold fitting 558 and groove 638 of the nut 576.

Figure 9:
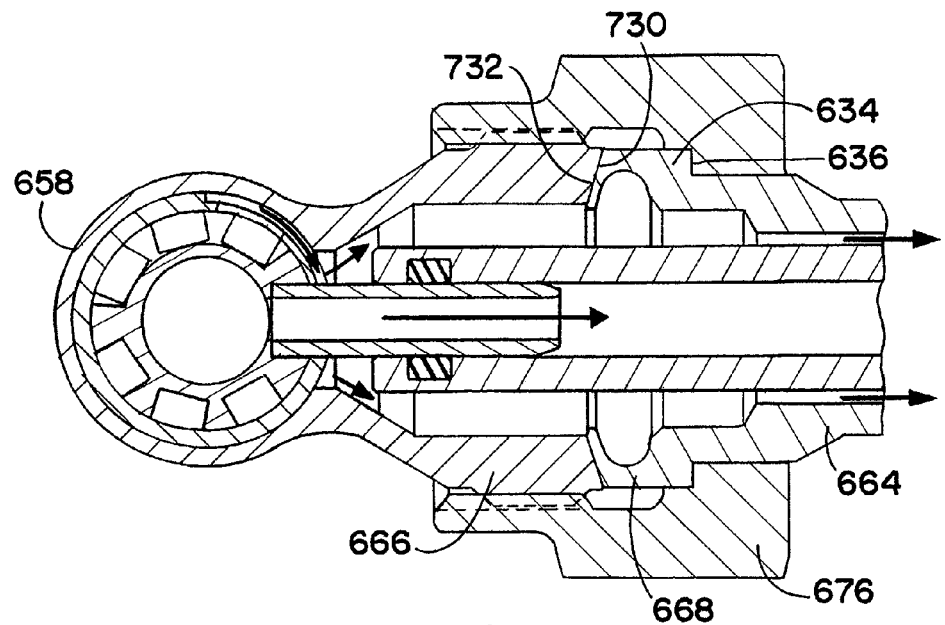
FIG. 9 is a cross-sectional view of a blown up portion of FIG. 2 illustrating still another exemplary manifold half and fitting portion taken substantially along the line M-M.

Referring now to FIG. 9, a proximal end 668 of the connector 664 and an end 666 of the manifold fitting 658 each have a tapered portion 730 and 732, respectively, that abut to form a beam seal fitting. A nut 676 may be provided that is coupled to the manifold fitting 658 and the connector 664 as described above in FIG. 7 to secure the end 666 of the manifold fitting to the proximal end 668 of the connector.

Figure 10:
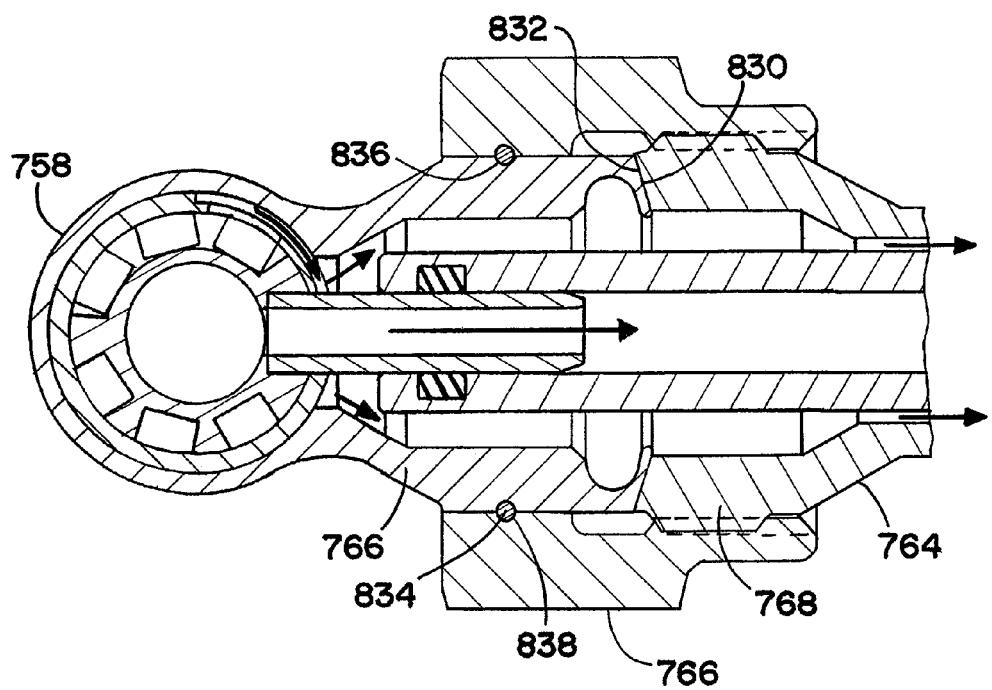
FIG. 10 is a cross-sectional view of a blown up portion of FIG. 2 illustrating a further exemplary manifold half and fitting portion taken substantially along the line M-M.

Referring now to FIG. 10, a proximal end 768 of a connector 764 and an end 766 of a manifold fitting 758 each have a tapered portion 830 and 832, respectively, that abut to form a beam seal fitting. A nut 776 may be provided that is coupled to the connector 764 and the manifold fitting 758 as described above in FIG. 8 to secure the end 766 of the manifold fitting to the proximal end 768 of the connector.

Figure 11:
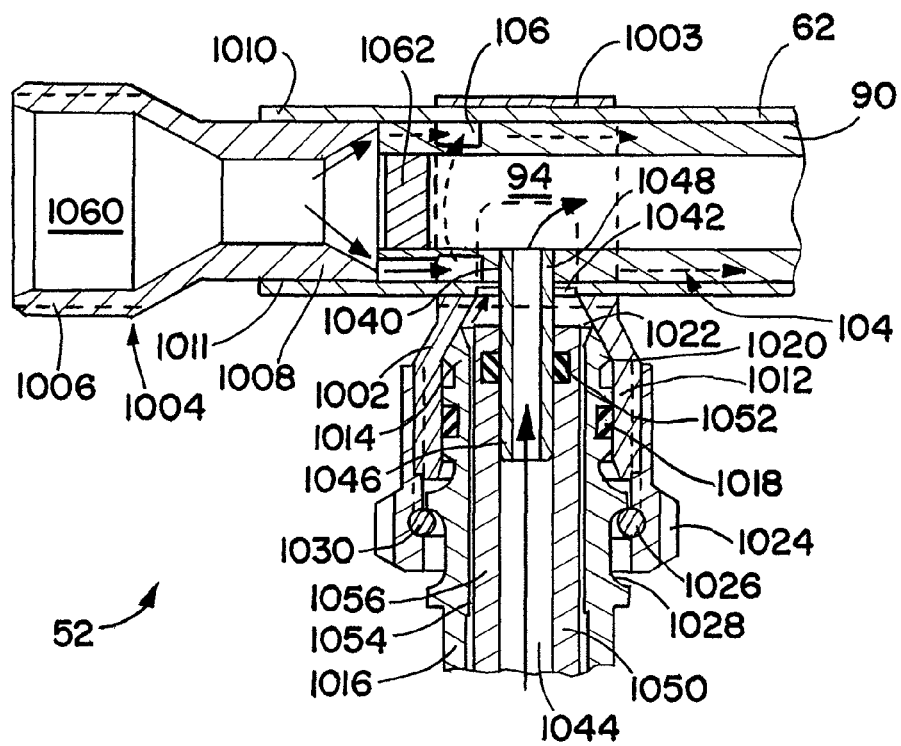
FIG. 11 is a cross-sectional view of an exemplary manifold inlet.

Turning now to FIG. 11, the manifold inlet 50 is discussed in detail. It will be appreciated that the manifold inlet 52 may be substantially the same as the manifold inlet 50. The manifold inlet includes a first manifold fitting 1002 surrounding the manifold tube assembly 62 and being coupled to the manifold tube assembly 62 by any suitable means, for example by a weld or braze joint at 1003, or any other method to attain a fluid tight seal. The manifold fitting and manifold tube assembly may be sized, for example, such that the outer diameter of the manifold tube assembly is substantially equal to the inner diameter of the manifold fitting. The manifold inlet also includes a second manifold fitting 1004 having a proximal end 1006 configured to be coupled to a fuel line by any suitable means, such as a threaded connection, and a distal end 1008 surrounded by and coupled to a proximal end 1010 of the manifold tube assembly by any suitable means, for example by a weld or braze joint at 1011, or any other method to attain a fluid tight seal.

The first manifold fitting 1002 has an end 1012 that surrounds a proximal end 1014 of a connector 1016 and which is sealed to the connector by any suitable means, such as by O-ring 1018. The connector also includes a distal end (not shown) configured to be coupled to a fuel line. The proximal end 1014 of the connector 1016 is configured to be inserted into the manifold fitting 1002 until a tapered portion 1020 of the proximal end 1014 contacts a tapered shoulder 1022 on an inner portion of the manifold fitting 1002, which also seals.

To secure the proximal end 1014 of the connector 1016 in the manifold fitting 1002, a nut 1024 is provided that surrounds and is coupled to the proximal end 1014 of the connector and the end 1012 of the manifold fitting 1002. The nut 1024 may be coupled to the end 1012 by any suitable means, for example by threads on an inner circumferential surface of the nut 1024 being coupled to threads on an outer circumferential surface of the end 1012. The nut 1024 may be coupled to the proximal end 1014 of the connector 1016 by any suitable means, for example by a thrust wire 1026 being received in groove 1028 of the connector 1016 and groove 1030 of the nut 1024. It will be appreciated from the foregoing that any suitable fitting portion may be used to couple to manifold fitting to the fuel line.

The inner tube 90 and outer tube 88 each include a respective opening 1040, 1042 in a side wall of a region surrounded by the manifold fitting 1002 so that fluid in a first fuel passage 1044 can flow into the main fuel passage 94.

A first connector tube 1046 is disposed in the openings 1040 and 1042 and coupled to the inner tube 90 by any suitable means, for example by a weld or braze at 1048 for a fluid tight seal. Surrounding at least a portion of the first connector tube 1046 is a second connector tube 1050, which is sealed to the first connector tube by any suitable means, such as by O-ring 1052. The second connector tube 1050 is free to slide relative to the first connector tube 1046, for example during installation or due to vibration from the engine. A distal end (not shown) of the second connector is configured to be coupled to a fuel line so that fuel can be received from the fuel line and delivered to the main fuel passage 94.

The second connector tube 1050 is disposed interiorly of the connector 1016 and sized such that a gap 1054 is formed between the second connector tube and the connector, which forms a first pilot fuel passage 1056. The second connector tube 1050 is axially spaced from a proximal end of the first connector tube 1046 a sufficient distance such that fluid flowing through the first pilot fuel passage can flow through the opening 1042 outside of the first connector tube 1046 and through a localized slot in the inner tube 90 into the first set of slots 100 and the first pilot fuel passage 104.

Turning again to the second manifold fitting 1004, the manifold fitting has a second pilot fuel passage 1060 therethrough. Fuel flowing through this fuel passage flows toward the distal end 1008 of the manifold fitting and into the second set of slots 102 and the second pilot fuel passage 106, which are in fluidic communication with the distal end. A weld or braze joint or other fluid tight seal is provided at 1062 that closes the inner tube 90 to prevent fuel in the second pilot fuel passage fuel passage from flowing into the main fuel passage 94. It can be appreciated that any pilot or main fuel passage can be switched.

Figure 12:
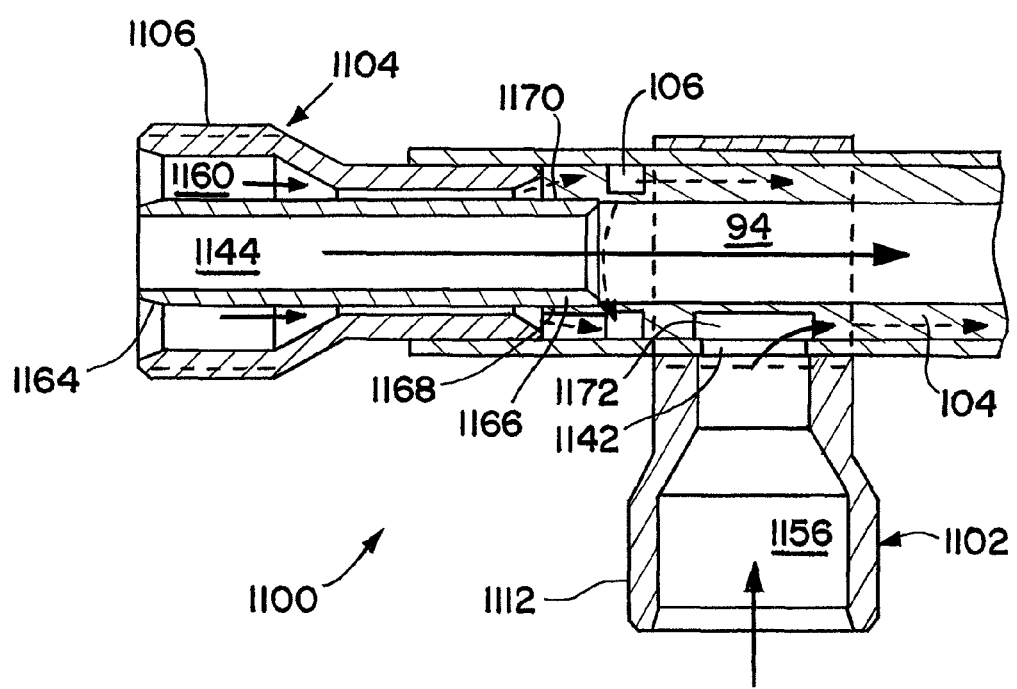
FIG. 12 is a cross-sectional view of another exemplary manifold inlet.

Turning now to FIG. 12, another exemplary embodiment of a manifold inlet is shown at 1100. The manifold inlet 1100 is substantially the same as the above-referenced manifold inlet 50, and consequently the same reference numerals, but indexed by 100 are used to denote structures corresponding to similar structures in the manifold inlets. In addition, the foregoing description of the manifold inlet 50 is equally applicable to the manifold inlet 1100 except as noted below. Moreover, it will be appreciated upon reading and understanding the specification that aspects of the manifold inlets may be substituted for one another or used in conjunction with one another where applicable.

The manifold inlet 1100 includes a first manifold fitting 1102 having an end 1112 configured to be coupled to a fuel line by any suitable means, such as a threaded connection. The manifold inlet also includes a second manifold fitting 1104 having a proximal end 1106 configured to be coupled to a connector 1116 in a similar manner as the first manifold fitting 1002 of FIG. 11.

Disposed interiorly of the second manifold fitting 1104 is a first connector tube 1146. The connector tube has a proximal end 1164 configured to be surrounded by and sealed to a second connector tube in a similar manner as the first connector tube 1046 of FIG. 11. The connector tube 1146 also has a distal end 1166 received in a proximal end 1168 of the inner tube 90 and coupled to the inner tube by any suitable means, for example by a weld or braze at 1170.

The inner tube 90 includes a localized slot 1172 and the outer tube 88 includes an opening 1142 in respective side walls of regions surrounded by the manifold fitting 1102 so that fluid in a first pilot fuel passage 1156 can flow into the first set of slots 100 and the first pilot fuel passage 104. The second manifold fitting 1104 has a first fuel passage 1144 so that fuel can flow from the fuel line into the main fuel passage 94. The second manifold fitting 1104 also has a second pilot fuel passage 1160 between an inner wall of the manifold fitting 1104 and an outer wall of the first connector tube 1164 so that fuel can flow into the second set of slots 102 and the second pilot fuel passage 106.

Figure 13:
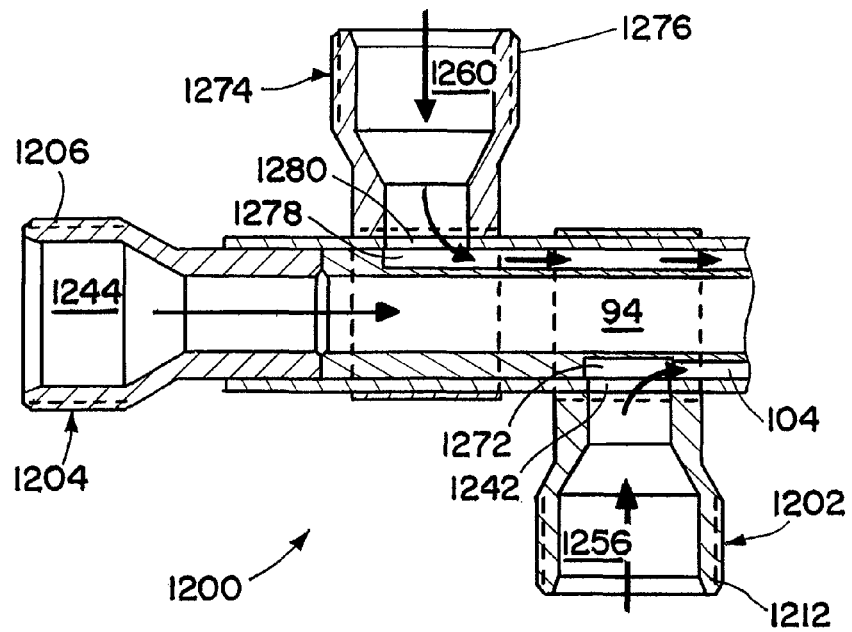
FIG. 13 is a cross-sectional view of yet another exemplary manifold inlet.

Turning now to FIG. 13, another exemplary embodiment of a manifold inlet is shown at 1200. The manifold inlet 1200 is substantially the same as the above-referenced manifold inlets 1100, and consequently the same reference numerals, but indexed by 100 are used to denote structures corresponding to similar structures in the manifold inlets. In addition, the foregoing description of the manifold inlets 50 and 1100 is equally applicable to the manifold inlet 1200 except as noted below. Moreover, it will be appreciated upon reading and understanding the specification that aspects of the manifold inlets may be substituted for one another or used in conjunction with one another where applicable.

The manifold inlet 1200 includes a first manifold fitting 1202, a second manifold fitting 1204 and a third manifold fitting 1274 having ends 1212, 1206 and 1276, respectively configured to be coupled to respective fuel lines by any suitable means, such as a threaded connection. The manifold fitting 1274 surrounds the manifold tube assembly 62 in a similar manner to the manifold fitting 1202, except as illustrated the ends 1212 and 1276 of the manifold fittings 1202 and 1274 face opposite directions. It will be appreciated however that the manifold fittings may be configured in any suitable orientation.

The inner tube 90 includes a localized slot 1272 and the outer tube 88 includes an opening 1242 in respective side walls of regions surrounded by the manifold fitting 1202 so that fluid in a first pilot fuel passage 1256 can flow into the first set of slots 100 and the first pilot fuel passage 104. Similarly, the inner tube 90 includes a localized slot 1278 and the outer tube 88 includes an opening 1280 in respective side walls of regions surrounded by the manifold fitting 1274 so that fluid in a second pilot fuel passage 1260 can flow into the second set of slots 102 and the second pilot fuel passage 106. The second manifold fitting 1204 has a first fuel passage 1244 so that fuel can flow from the fuel line into the main fuel passage 94.

Figure 14:
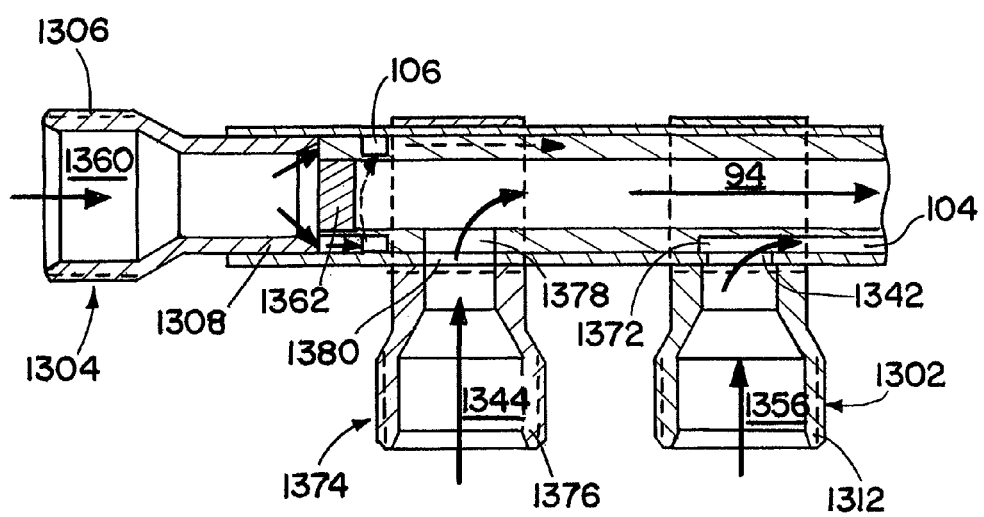
FIG. 14 is a cross-sectional view of still another exemplary manifold inlet.

Turning now to FIG. 14, another exemplary embodiment of a manifold inlet is shown at 1300. The manifold inlet 1300 is substantially the same as the above-referenced manifold inlets 1200, and consequently the same reference numerals, but indexed by 100 are used to denote structures corresponding to similar structures in the manifold inlets. In addition, the foregoing description of the manifold inlets 50, 1100 and 1220 is equally applicable to the manifold inlet 1300 except as noted below. Moreover, it will be appreciated upon reading and understanding the specification that aspects of the manifold inlets may be substituted for one another or used in conjunction with one another where applicable.

The manifold inlet 1300 includes a first manifold fitting 1302, a second manifold fitting 1304 and a third manifold fitting 1374 having ends 1312, 1306 and 1376, respectively configured to be coupled to respective fuel lines by any suitable means, such as a threaded connection. The manifold fittings 1302 and 1374 surround the manifold tube assembly 62 and the ends 1312 and 1376 of the manifold fittings 1302 and 1374 face the same direction.

The inner tube 90 includes a localized slot 1372 and the outer tube 88 includes an opening 1342 in respective side walls of regions surrounded by the manifold fitting 1202 so that fluid in a second fuel passage 1356 can flow into the first set of slots 100 and the first pilot fuel passage 104. The inner tube 90 and outer tube 88 also include respective openings 1378 and 1380 in respective side walls of regions surrounded by the manifold fitting 1374 so that fuel in a first fuel passage 1344 can flow into the main fuel passage 94.

Turning again to the second manifold fitting 1304, the manifold fitting has a third fuel passage 1360 therethrough. Fuel flowing through the third fuel passage flows toward a distal end 1308 of the manifold fitting and into the second set of slots 102 and the second pilot fuel passage 106, which are in fluidic communication with the distal end. A weld or braze joint is provided at 1362 that closes the inner tube 90 to prevent fuel in the third fuel passage from flowing into the main fuel passage 94.

Figure 15:
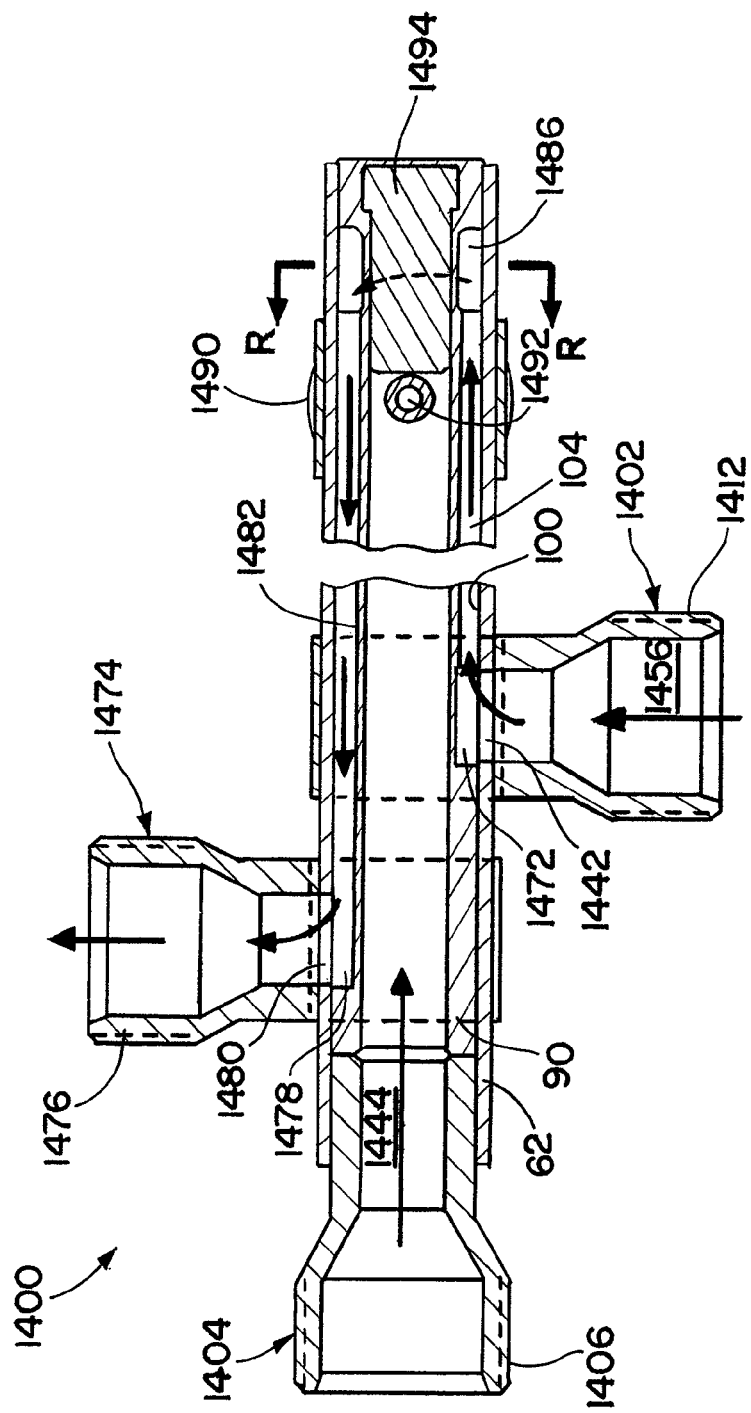
FIG. 15 is a cross-sectional view of a further exemplary manifold inlet and a partial cross-sectional view of an exemplary manifold tube assembly.

Turning now to FIG. 15, another exemplary embodiment of a manifold inlet is shown at 1400. The manifold inlet 1400 is substantially the same as the above-referenced manifold inlets 1200, and consequently the same reference numerals, but indexed by 200 are used to denote structures corresponding to similar structures in the manifold inlets. In addition, the foregoing description of the manifold inlets 50, 1000, 1100, 1200 and 1300 is equally applicable to the manifold inlet 1400 except as noted below. Moreover, it will be appreciated upon reading and understanding the specification that aspects of the manifold inlets may be substituted for one another or used in conjunction with one another where applicable.

The manifold inlet 1400 includes a first manifold fitting 1402, a second manifold fitting 1404 and a third manifold fitting 1474 having ends 1412, 1406 and 1476, respectively configured to be coupled to respective fuel lines by any suitable means, such as a threaded connection. The inner tube 90 includes a localized slot 1472 and the outer tube 88 includes an opening 1442 in respective side walls of regions surrounded by the manifold fitting 1402 so that fluid in a second fuel passage 1456 can flow into the first set of slots 100 and the first pilot fuel passage 104. The second manifold fitting 1404 has a first fuel passage 1444 so that fuel can flow from the fuel line into the main fuel passage 94.

The third manifold fitting 1474 is provided to receive from at least one recirculation pilot flow slot 1482 fuel from the first pilot fuel passage 104 that is being recirculated, for example to prevent coking. The inner tube 90 includes a localized slot 1478 and the outer tube 88 includes an opening 1480 in respective side walls of regions surrounded by the manifold fitting 1402 so that fluid in the fuel slot 1482 can flow into a third fuel passage 1484 in the manifold fitting.

Figure 16:
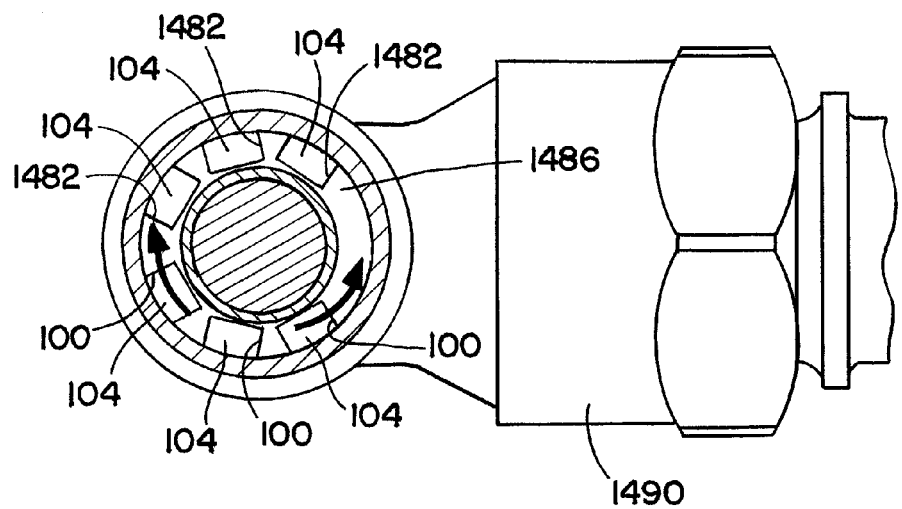
FIG. 16 is a cross-sectional view of the manifold tube assembly taken substantially along the line R-R of FIG. 15.

The fuel flows from the first manifold fitting 1402 to an end of the manifold tube assembly 62. Then, as shown in FIG. 16, the fuel exits the slots 100 and flows into a localized, full annular slot 1486. The fuel flows from the localized slot 1486 and into the slots the recirculation pilot flow slot 1482. Accordingly, a continuous flowing pilot is provided that can deliver fuel to one or more injectors as it flows through the either pilot flow passage, connect to another single pilot fuel line, connect to another manifold, etc. For example, the manifold half 48 may be coupled to the end of the manifold tube assembly 62.

As will be appreciated, a manifold fitting 1490 provided at the end of the manifold tube assembly 62 includes a fuel passage 1492 for receiving fuel from the main fuel passage 94 to deliver the fuel to an injector coupled to the manifold fitting 1490. Moreover, a plug 1494 may be provided at the end of the manifold tube assembly 62 that closes the end of the inner tube 92 and manifold tube assembly 62.

Figure 17:
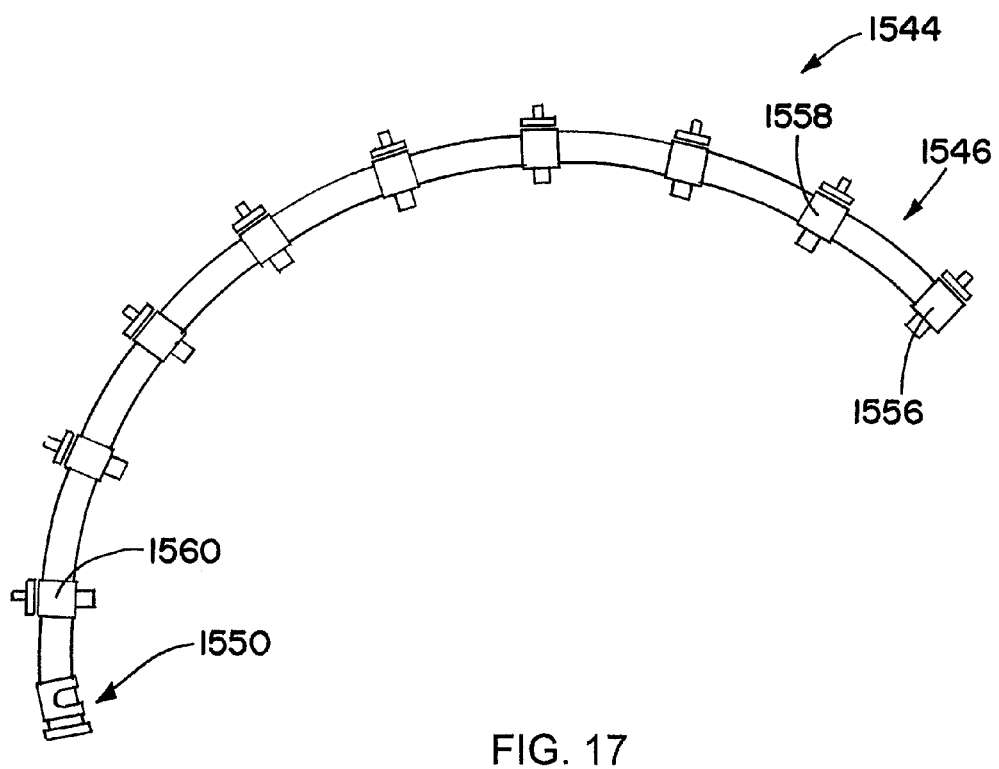
FIG. 17 is a side view of another manifold half in accordance with the invention.
Figure 18:
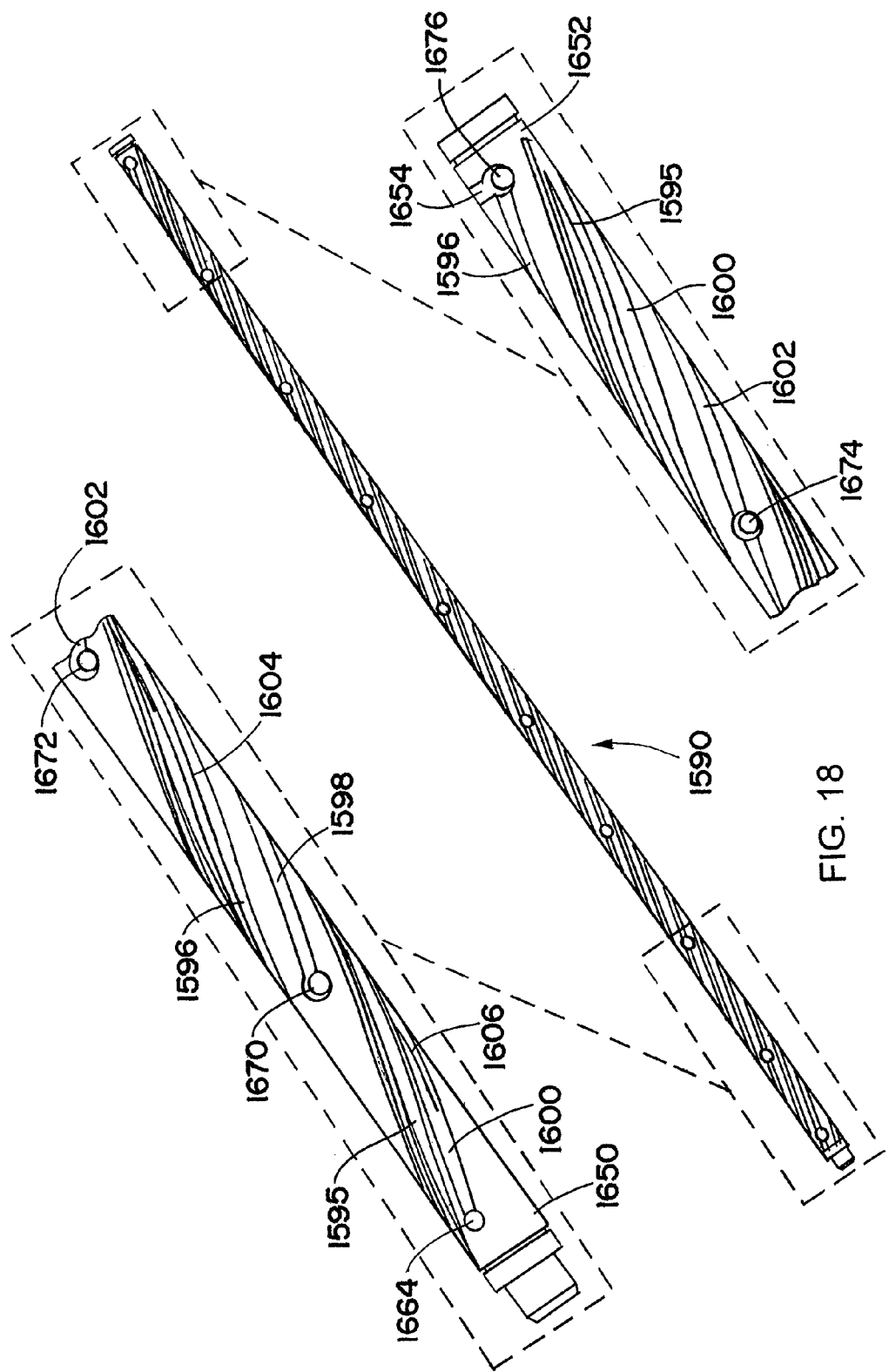
FIG. 18 is a side view of an inner tube of the manifold half of FIG. 17.
Figure 19:
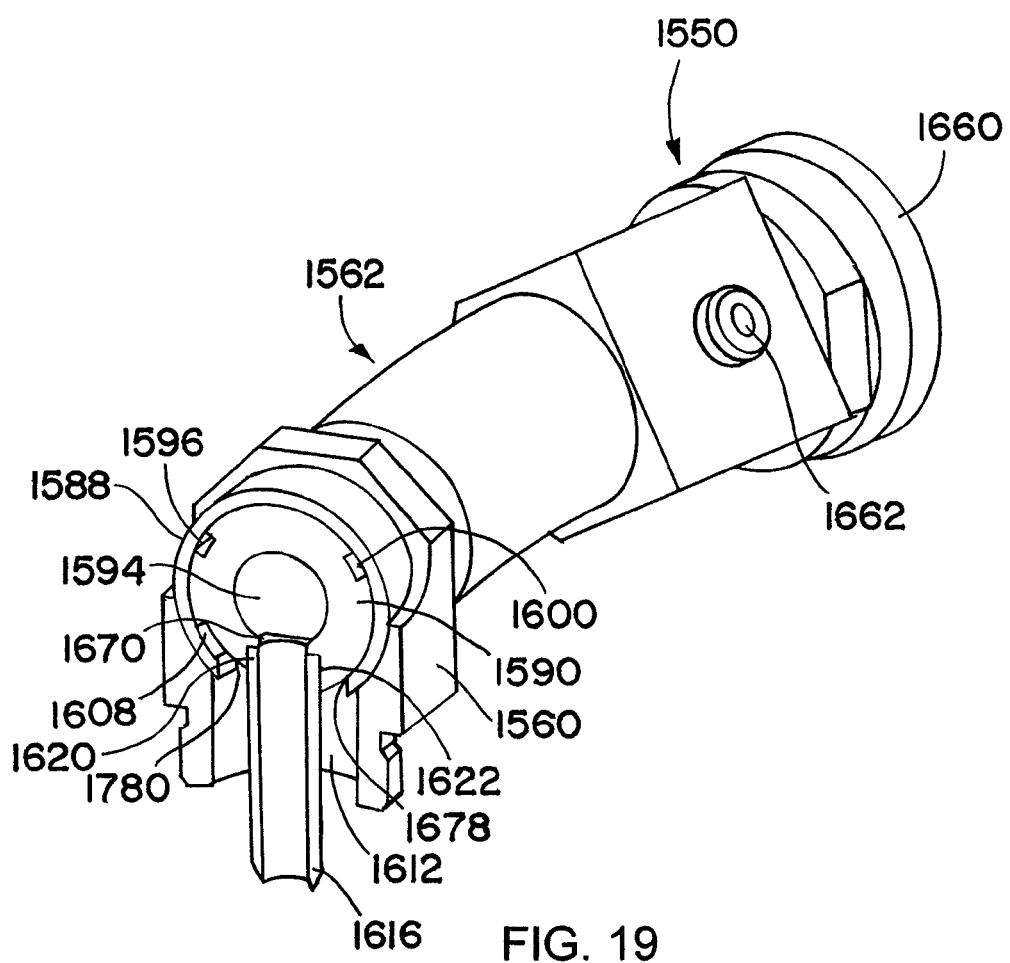
FIG. 19 is a sectioned perspective view of the manifold half of FIG. 17.

Turning now to FIGS. 17-19, another exemplary embodiment of a manifold is shown at 1544. The manifold 1544 is substantially the same as the above-referenced manifold 44, and consequently the same reference numerals, but indexed by 1500 are used to denote structures corresponding to similar structures in the manifold inlets. In addition, the foregoing description of the manifold 44 is equally applicable to the manifold 1544 except as noted below. Moreover, it will be appreciated upon reading and understanding the specification that aspects of the manifolds may be substituted for one another or used in conjunction with one another where applicable.

The manifold 1544 includes first and second manifold halves 1546 and 1548 that may be substantially similar to one another, and therefore only manifold half 1546 is shown. The manifold half 1546 includes a plurality of manifold fittings, such as manifold fittings 1556, 1558 and 1560 that surround a manifold tube assembly 1562 that provides fuel from a manifold inlet 1550 to the plurality of manifold fittings. The manifold tube assembly 1562 includes an outer tube 1588 and an inner tube 1590 disposed interiorly of the outer tube.

As shown in FIG. 18, the inner tube 1590 has a main fuel passage 1594 formed interiorly of the inner tube and a plurality of helical slots or grooves 1595, 1596, 1598, 1600 and 1602 in an outer wall of the inner tube. The slot 1595 is provided to reduce material and act as heatshielding for the manifold tube assembly 1562. The slots 1596 and 1598 form with an inner circumferential surface of the outer tube 1588 a first pilot fuel passage 1604. The first pilot fuel passage runs along the slot 1596 from a proximal end 1650 of the inner tube to a distal end 1652 of the inner tube, along a localized slot 1654 to the slot 1598, and along the slot 1598 from the distal end 1652 to the proximal end 1650.

The slots 1600 and 1602 form with the inner circumferential surface of the outer tube 1588 a second pilot fuel passage 1606. The second pilot fuel passage runs along the slot 1600 from the proximal end 1650 to the distal end 1652, along a localized slot (not shown) to the slot 1602, and along the slot 1602 from the distal end 1652 to the proximal end 1650.

Fuel enters the pilot fuel passages 1604 and 1606 in a similar manner as described in FIG. 12 above, although it will be appreciated that any suitable manifold inlet may be provided. For example, fuel enters the main fuel passage 94 and the first pilot fuel passage 1604 of the manifold inlet 1550 at fitting 1660 and the second pilot passage 1606 of the manifold inlet at an inlet portion 1662. The fuel in the first pilot fuel passage enters the slot 1596 at an end of the slot (not shown) and the fuel in the second pilot fuel passage enters the slot 1600 at an end 1664 of the slot.

Spaced along the inner tube 1590 is a plurality of openings, for example openings 1670, 1672, 1674 and 1676, in a side wall of the inner tube at respective areas of the inner tube surrounded by the manifold fittings. The openings are provided so that fuel in the main fuel passage 1594 can flow from the main fuel passage to an injector. To do so, disposed in the openings are first connector tubes, such as the first connector tube 1616 shown in FIG. 19. The first connector tube has a proximal end 1620 that is disposed in the opening 1670 and coupled to the inner tube 1590 by any suitable means, for example by a braze or weld at 1622. Fuel from the main fuel passage 1594 is received in a first fuel passage 1628 formed interiorly of the connector.

Similar to the inner tube 1590, spaced along the outer tube 1588 is a plurality of openings, such as opening 1678 shown in FIG. 19. The opening 1678 is sized to be larger than an outer diameter of the first connector tube 1616 such that an annular passageway 1780 is provided around the first connector tube. The annular passageway 1780 allows fuel flowing in the first pilot fuel passage via slot 1598 to flow around the first connector tube 1616, between the outer wall of the inner tube 1590 and the inner wall of the outer tube 1588 and to a second fuel passage 1612. The second fuel passage is formed between an outer wall of the first connector tube 1616 and an inner wall of an end 1566 of the manifold fitting 1560. The annular passageway 1780 also allows fuel flowing in the first pilot fuel passage to continue to flow through the pilot fuel passage. Additionally, the inner tube 1590 may include a localized slot 1608 for fuel to flow from around the inner connector tube 1616, although it will be appreciated that localized slot 1608 may be omitted.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multiple circuit fuel manifold for connecting a fuel source or fuel sources to at least one fuel injector, the manifold including:
    a manifold tube assembly and a manifold fitting surrounding the manifold tube assembly, the manifold fitting having an end configured to be coupled to a connector;
    the manifold tube assembly including:
        an inner tube for conveying fuel through a first fuel passage formed interiorly of the inner tube, the inner tube including:
            at least one slot along a length of an outside diameter thereof; and
            an opening in a side wall of the inner tube in an area of the inner tube surrounded by the manifold fitting, the opening provided to convey fuel from the first fuel passage to an inner connector tube disposed in the opening;
        an outer tube surrounding the inner tube and forming with the at least one slot a second fuel passage, the outer tube including an opening in a side wall of the outer tube in an area of the outer tube surrounded by the manifold fitting, the opening in the side wall of the outer tube allowing fuel to pass from the at least one slot to a gap between the manifold fitting and the inner connector tube.

2. A fuel manifold according to claim 1, wherein the inner tube includes at least two slots, one of the slots forming with the outer tube the second fuel passage and the other slot forming with the outer tube a third fuel passage.

3. A fuel manifold according to claim 2, wherein the fuel in the second fuel passage passes into the gap and flows downstream of the manifold fitting and the fuel in the third fuel passage flows downstream of the manifold fitting.

4. A fuel manifold according to claim 2, further including a manifold inlet including a first inlet fitting in fluidic communication with the first fuel passage, a second inlet fitting in fluidic communication with the second fuel passage and a third inlet fitting in fluidic communication with the third fuel passage, each inlet fitting being configured to be coupled to a fuel line.

5. A fuel manifold according to claim 2, further including a manifold inlet including:
    a first inlet fitting surrounding a second connector tube, the second connector tube being coupled to a proximal end of the inner tube and including:
        a first connector flow passage disposed interiorly thereof in fluidic communication with the first fuel passage; and
        a second connector flow passage formed between an inner wall of the inlet fitting and an outer wall of the second connector tube, the second connector flow passage in fluidic communication with the second fuel passage; and
    a second inlet fitting in fluidic communication with the third fuel passage;
    wherein each fitting is configured to be coupled to a fuel line.

6. A fuel manifold according to claim 1, further including a manifold inlet including a first inlet fitting in fluidic communication with the first fuel passage and a second inlet fitting in fluidic communication with the second fuel passage, each inlet fitting being configured to be coupled to a fuel line.

7. A fuel manifold according to claim 1, wherein the at least one slot is a helical slot.

8. A fuel manifold according to claim 7, wherein the inner tube includes at least two helical slots that form with the outer tube the second fuel passage.

9. A fuel manifold according to claim 8, wherein the second fuel passage runs along one of the slots from a proximal end of the manifold tube assembly to a distal end of the manifold tube assembly, along a localized slot connecting an end of the slot to an end of the other slot, and along the other slot from the distal end of the manifold tube assembly to the proximal end of the manifold tube assembly.

10. A fuel manifold according to claim 8, further including at least two additional helical slots in the inner tube that form with the outer tube a third fuel passage.

11. A fuel manifold according to claim 10, wherein the third fuel passage runs along one of the additional slots from the proximal end of the manifold tube assembly to the distal end of the manifold tube assembly, along a localized slot connecting an end of the slot to an end of the other additional slot, and along the other additional slot from the distal end of the manifold tube assembly to the proximal end of the manifold tube assembly.

12. A fuel manifold according to claim 1, further including a manifold inlet including a first inlet fitting in fluidic communication with the first fuel passage and a second inlet fitting in fluidic communication with the second fuel passage, each inlet fitting being configured to be coupled to a fuel line.

13. A fuel manifold according to claim 1, wherein the inner tube includes a cylindrical portion forming the first fuel passage and at least two projections extending radially outward from the cylindrical portion.

14. A fuel manifold according to claim 13, wherein the projections are coupled to an inner diameter of the outer tube and form with the outer tube and an outer wall of the cylindrical portion the at least one slot.

15. A fuel manifold including at least two manifold segments, each segment having a manifold tube assembly and at least one manifold fitting according to claim 1.

16. A fuel manifold according to claim 1 in combination with a tubular assembly, the tubular assembly including an second inner connector tube surrounding the first inner connector tube and a connector at least partially surrounding the second inner connector tube and having a proximal end coupled to the manifold fitting.

17. The combination according to claim 16, further including:
a nut having an inner circumferential groove and a threaded portion axially spaced from the groove on an inner circumferential surface of the nut;
wherein the threaded portion is configured to be coupled to a threaded portion on an outer circumferential surface of the proximal end of the connector; and
wherein a thrust wire is configured to be received in the inner circumferential groove of the threaded portion and an outer circumferential groove of the manifold fitting.

18. The combination according to claim 16, further including:
a nut having a threaded portion on an inner circumferential surface and an inner shoulder axially spaced from the threaded portion;
wherein the threaded portion is configured to be coupled to a threaded portion on an outer circumferential surface of the manifold fitting; and
wherein the inner shoulder abuts a flanged portion of the connector when the nut is coupled to the manifold fitting.

19. A method of delivering fuel from a multiple circuit manifold to a fuel injector, the manifold including a manifold inlet having first and second inlet fittings, a manifold tube assembly, and a manifold fitting surrounding the manifold tube assembly, the manifold tube assembly including an inner tube for conveying fuel through a first fuel passage formed interiorly of the inner tube, the inner tube having at least one slot along a length of an outside diameter thereof and an opening in a side wall of the inner tube in an area of the inner tube surrounded by the manifold fitting, the opening provided to convey fuel from the first fuel passage to an inner connector tube disposed in the opening, and an outer tube surrounding the inner tube and forming with the at least one slot a second fuel passage, the outer tube including an opening in a side wall of the outer tube in an area of the outer tube surrounded by the manifold fitting, the opening in the side wall of the outer tube allowing fuel to pass from the at least one slot to a gap between the manifold fitting and the inner connector tube, the method including: receiving fuel at the first inlet fitting; delivering the fuel through the first fuel passage to the inner connector; receiving fuel at the second inlet fitting; and delivering fuel through the second fuel passage to the gap.

* * * * *